United States Patent
Nemirovsky et al.

(10) Patent No.: US 6,477,562 B2
(45) Date of Patent: *Nov. 5, 2002

(54) PRIORITIZED INSTRUCTION SCHEDULING FOR MULTI-STREAMING PROCESSORS

(75) Inventors: Mario D. Nemirovsky, Saratoga, CA (US); Adolfo M. Nemirovsky, San Jose, CA (US); Narendra Sankar, Santa Clara, CA (US)

(73) Assignee: Clearwater Networks, Inc., Los Gatos, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,017

(22) Filed: Dec. 16, 1998

(65) Prior Publication Data

US 2002/0062435 A1 May 23, 2002

(51) Int. Cl.[7] .................................................. G06F 9/00
(52) U.S. Cl. ........................................ 709/108; 712/23
(58) Field of Search ......................... 712/23, 41, 228; 709/106, 107, 108

(56) References Cited

U.S. PATENT DOCUMENTS

| | | | |
|---|---|---|---|
| 5,461,722 A | | 10/1995 | Goto |
| 5,600,837 A | | 2/1997 | Artieri |
| 5,815,733 A | * | 9/1998 | Anderson et al. ............... 710/48 |
| 5,987,492 A | * | 11/1999 | Yue ............................ 709/102 |
| 6,018,759 A | * | 1/2000 | Doing et al. ................. 709/108 |
| 6,052,708 A | * | 4/2000 | Flynn et al. ................. 709/108 |
| 6,212,544 B1 | * | 4/2001 | Borkenhagen et al. ....... 709/103 |

OTHER PUBLICATIONS

Fiske et al. Thread Prioitization: A Thread SCheduling Mechanism for Multiple–Context Parallel Processors 1996.*
Yamamoto An Analysis of Multistreamed, Superscalar Processor Architecture 1995.*
Steese et al. A Feedback–driven Proportion 2/99 Allocator for Real–Rate Scheduling.*

* cited by examiner

Primary Examiner—Larry D. Donaghue
(74) Attorney, Agent, or Firm—Donald R. Boys; Central Coast Patent Agency, Inc.

(57) ABSTRACT

A multi-streaming processor has multiple streams for processing multiple threads, and an instruction scheduler including a priority record of priority codes for one or more of the streams. The priority codes determine in some embodiments relative access to resources as well as which stream has access at any point in time. In other embodiments priorities are determined dynamically and altered on-the-fly, which may be done by various criteria, such as on-chip processing statistics, by executing one or more priority algorithms, by input from off-chip, according to stream loading, or by combinations of these and other methods. In one embodiment a special code is used for disabling a stream, and streams may be enabled and disabled dynamically by various methods, such as by on-chip events, processing statistics, inpu from off-chip, and by processor interrupts. Some specific applications are taught, including for IP-routers and digital signal processors.

50 Claims, 2 Drawing Sheets

PRIORITIZED INSTRUCTION SCHEDULING FOR MULTI-STREAMING PROCESSORS

FIELD OF THE INVENTION

The present invention is in the field of digital microprocessors, and pertains more particularly to such devices capable of operating with multiple processing streams, which are termed multi-streaming processors in the art.

BACKGROUND OF THE INVENTION

Multi-streaming processors capable of processing multiple threads are known in the art, and have been the subject of considerable research and development. The present invention takes notice of the prior work in this field, and builds upon that work, bringing new and non-obvious improvements in apparatus and methods to the art. The inventors have provided with this patent application an Information Disclosure Statement listing a number of published papers in the technical field of multi-streaming processors, which together provide additional background and context for the several aspects of the present invention disclosed herein.

For purposes of definition, this specification regards a stream in reference to a processor as principally hardware structure on the processor capable of supporting and processing an instruction thread. A thread is defined by software or application context. For example, a multi-streaming processor implemented as a CPU for operating a desktop computer may simultaneously process threads from two or more applications, such as a word processing program and an object-oriented drawing program. As another example, a multi-stream-capable processor may operate a machine without regular human direction, such as a router in a data-packet network. In this context there may be, for example, one or more applications (code sets) for processing and forwarding data packets on the network, and another for such as quality-of-service (QoS) negotiation with other routers and servers connected to the network. The nature of data received for processing, together with pre-programmed scheduling for internal functions will determine the calling and serving of application routines.

In either of the above cases the maximum capability of the processor to process multiple threads remains fixed at the number of hardware-limited streams. A multi-streaming processor operating a single thread therefore operates as a single-stream processor.

As described above and in the papers provided by IDS in the present case, superscalar processors are also known in the art. This term refers to processors that have more than one functional unit implemented on the processor chip, and an ability to issue instructions to individual ones of the functional units available. Most CPU processors built today have more than a single functional unit. Some have many such units, including such as Floating Point units, Integer Units, Logic Units, Branch Prediction units, Load/Store units and so forth. Multi-streaming superscalar processors are known in the art as well.

The inventors have determined that there is a significantly neglected field in the art, relative to scheduling instructions from streams to functional resources, whether there are one or more functional units. The issue is priority, and which stream is to be given priority to the functional resources. This is an issue in all multi-streaming processors, and can be a more complicated issue in superscalar processors running multiple instruction threads. In most development in the art, scheduling has been developed to maximize processor efficiency. The inventors have discovered that rapid extension of digital processing into growing technology fields has created a critical need for dynamic prioritizing of thread processing and access to processor resources.

In many application mixes it has become clear to the inventors that application criticality is a dominant issue, rather than processor utilization, although both need to be considered. Up to the present most attention has been given to processor utilization. As an example, in most real applications for multi-streaming processors, as opposed to theoretical, or academic exercises, there are real-time requirements. Moreover, the criticality of some application threads may change relative to others during run time, depending on a number of issues, and the unsophisticated means of sharing and scheduling presently available in the art do not address real-world issues.

Accordingly, what is clearly needed in the art is apparatus and methods for more sophisticated and dynamic scheduling and prioritizing of tasks and threads for multi-streaming processors, including superscalar processors. The present invention teaches such apparatus and methods, which are disclosed below in enabling detail.

SUMMARY OF THE INVENTION

In a preferred embodiment of the present invention a multi-streaming processor is provided, comprising a plurality of streams for streaming one or more instruction threads; a set of functional resources for processing instructions from streams; an instruction scheduler for managing access for the streams to the functional resources; and a priority record of priority codes associated with streams. At any point in time the instruction scheduler manages access for a stream to the functional resources according to the priority record.

In some embodiments the priority record comprises one or more priority codes associated with at least one of the streams, and the priority record is static and not varying. In some other embodiments the priority record is varied in a consistently repeating manner. In some embodiments the processor has a priority controller coupled to the priority record, wherein the priority controller alters the one or more priority codes dynamically during processing. Alteration of priority codes may be accomplished at least in part in a manner determined by changes in on-chip processing statistics. Determination of priority codes may also, in some embodiments, be accomplished at least in part off-chip, and communicated to the priority controller. In yet other embodiments the priority controller alters priority codes according to instant states of stream instruction loading.

In one embodiment of the invention a particular priority code effectively disables a stream, preventing access for that stream to functional resources. In some cases the priority controller alters the priority record to enable and disable a stream in response to on-chip events, processing statistics, or external input. In some cases according to a processor interrupt.

In yet other embodiments of the invention the processor further comprises a tie-breaker function, the tie-breaker resolving access to functional resources for two or more streams having equal priority in the priority record.

In another aspect of the invention a multi-streaming processor is provided, comprising a plurality of streams for streaming a plurality of instruction threads; a set of functional resources for processing instructions from stream resources; a fetch unit for fetching instructions to the streams; an instruction scheduler for managing access for streams to the functional resources; a priority record of priority codes associated with streams; and a priority controller dynamically determining priorities and altering the priority record during processing.

In this aspect as well, alteration of the priority record may be accomplished at least in part in a manner determined by on-chip processing statistics. And in some embodiments alteration of the priority record may be accomplished at least in part off-chip, and communicated to the priority controller. In some embodiments a particular priority code may be used to effectively disable a stream, preventing access for that stream to functional resources. Enabling and disabling may be done in response to on-chip events, processing statistics, or external input. In some cases according to a processor interrupt. In some cases priority may be altered according to stream instruction loading. In this as well as other aspects a tie-breaker function may be provided, the tie-breaker resolving access to functional resources for two or more streams having equal priority in the priority record.

According to another aspect of the invention a method for processing instructions from streams by priority in a multi-streaming processor is provided, comprising steps of (a) associating priority codes with one or more of the streams and storing the codes in a priority record; (b) checking priority codes in the priority record by an instruction scheduler during processing; and (c) managing access for streams to functional resources preferentially based on the priority codes. The priority codes in the priority record in this method may be static and not varying, or varied in a consistently repeating manner.

In some embodiments of this method there is a further step for altering the priority codes in the priority record dynamically during processing by a priority controller coupled to the priority record. The alteration of priority codes may be accomplished at least in part in a manner determined by changes in on-chip processing statistics, or accomplished at least in part off-chip, and communicated to the priority controller.

In some embodiments of the invention a particular priority code effectively disables a stream, preventing access for that stream to functional resources.

Enabling and disabling may be in response to on-chip events, processing statistics, or external input. In some cases according to a processor interrupt. Priority codes may also be altered according to instant states of stream instruction loading. In this method a step may also be provided for a tie-breaker function, the tie-breaker resolving access to functional resources for two or more streams having equal priority in the priority record.

In yet another aspect of the invention a method is provided for processing instructions from streams by priority in a multi-streaming processor, comprising steps of (a) associating priority codes with one or more of the streams and storing the codes in a priority record; (b) checking priority codes in the priority record by an instruction scheduler during processing; (c) managing access for streams to functional resources preferentially based on the priority codes; and (d) dynamically altering priority codes in the priority record by a priority controller during processing.

In this method, in step (d), the alteration of priority codes may be accomplished at least in part in a manner determined by changes in on-chip processing statistics. Also in this method determination of priority codes may be accomplished at least in part off-chip, and communicated to the priority controller. In this method as well a special priority code may be used to effectively disable a stream, preventing access for that stream to functional resources. Enabling and disabling may be done in response to on-chip events, processing statistics, or external input. In some cases according to a processor interrupt.

Further in this method priority may be altered according to instant states of stream instruction loading. Further yet in this method a tie-breaker function may be provided, the tie-breaker resolving access to functional resources for two or more streams having equal priority in the priority record.

In yet another aspect of the invention a computer is provided, comprising a memory for storing application programs and data; and a multi-streaming processor coupled to the memory and having a plurality of streams for processing a plurality of instruction threads, a set of functional resources for processing instructions from the streams, an instruction scheduler for managing access for the streams to the functional resources, and a priority record of priority codes associated with streams. At any point in time the instruction scheduler manages access for a stream to the functional resources according to the priority record.

In some embodiments of this computer the priority record comprises one or more priority codes associated with at least one of the streams, and the priority record is static and not varying. In other the priority record is varied in a consistently repeating manner. Also in some embodiments the priority record comprises one or more priority codes associated with one or more of the streams, and the processor further comprises a priority controller coupled to the priority record, wherein the priority controller alters the one or more priority codes dynamically during processing. In some cases the alteration of priority codes may be accomplished at least in part in a manner determined by changes in on-chip processing statistics. In the same embodiments and others determination of priority codes may be accomplished at least in part off-chip, and communicated to the priority controller.

In some embodiments of this computer a particular priority code effectively disables a stream, preventing access for that stream to functional resources. In some cases the priority controller alters the priority record to enable and disable a stream in response to on-chip events, processing statistics, or external input. In some cases according to a processor interrupt. The priority controller may also alter priority codes according to instant states of stream instruction loading. In some cases there is tie-breaker function, the tie-breaker resolving access to functional resources for two or more streams having equal priority in the priority record.

In yet another aspect of the invention a computer is provided, comprising a memory for storing application programs and data; and a multi-streaming processor coupled to the memory and having a plurality of streams for streaming a plurality of instruction threads, a set of functional resources for processing instructions from stream resources, an instruction scheduler for managing access for the streams to the functional resources, and a priority record of priority codes associated with the streams. A priority controller dynamically determines priority codes during processing and alters the priority record accordingly.

In some embodiments this computer alteration of the priority record is accomplished at least in part in a manner determined by on-chip processing statistics. In others alteration of the priority record is accomplished at least in part off-chip, and communicated to the priority controller. In some embodiments a particular priority code effectively disables a stream, preventing access for that stream to functional resources. The priority controller may alter the priority record to enable and disable a stream in response to on-chip events, processing statistics, or external input. In some cases according to a processor interrupt.

Further, the priority controller may alter priority codes according to instant states of stream instruction loading. In this computer there may also be provided a tie-breaker function, the tie-breaker resolving access to functional resources for two or more streams having equal priority in the priority record.

In yet another aspect of the invention a packet-data router for a packet data network is provided, comprising at least one port for connecting to the packet-data network; a memory for storing application code; and a multi-streaming processor coupled to the memory and having a plurality of streams for streaming a plurality of instruction threads, a set of functional resources for processing instructions from stream resources, an instruction scheduler for managing access for the streams to the functional resources, and a priority record of priority codes associated with the streams. A priority controller dynamically determines priority codes during processing and alters the priority record accordingly.

In yet another aspect a digital signal processor is provided, comprising a plurality of streams for streaming a plurality of signals as separate threads; a set of functional resources for processing signals; a scheduler for managing access for the signals to the functional resources; and a priority record of priority codes associated with the streams. A priority controller dynamically determines priority codes during processing and alters the priority record accordingly.

In the several embodiments of the invention described and taught in enabling detail below, for the first time in the computer arts a multi-streaming processor is provided wherein access for streams to functional processor resources is selectively managed, and wherein priorities for streams to access functional resources may be dynamically managed, bringing increased processing power, more efficient use of resources, and, in particular, attention to real-time processing needs.

DESCRIPTION OF THE PREFERRED EMBODIMENTS

A multi-streaming processor is a processor having resources adapted to execute multiple instruction streams in parallel from multiple available program threads. The present invention in one aspect comprises an instruction scheduler in combination with a priority controller that prioritizes and coordinates efficient and timely allocation of concurrent streams to one or more processing resources, including functional units.

In a preferred embodiment of the present invention, each stream is assigned a priority, representing the associated stream's claim to processing resources relative to competing instruction streams. Priorities may be implemented by a single number representing the associated stream's relative claim on all processor resources, or by a list containing priorities for each of several resources. In addition priorities can include degree of access to available resources, and limitations to access among available resources. Logic for determining and issuing priorities in various embodiments of the invention may be implemented in a variety of ways, as indicated in descriptions below.

In some embodiments, priorities may be fixed by stream, but access to resources may be managed in addition to priority access. In others priority by stream may vary, and access may be dynamically managed as well. Criteria for both access and priority determination may be from varied sources as well; in some cases according to on-chip statistics, such as current cache and memory requests, functional unit utilization or branch prediction, among other things; in others according to data arrival and availability, in others by input from off-chip, and in combinations of these and other criteria. In preferred embodiments priority issue logic controls and manages each stream's access to the processor's functional resources in accordance with current priority. Also in preferred embodiments priority control and instruction issue functions can be dynamically changed to assure that each thread is serviced in timely fashion, while also efficiently managing utilization of processor resources within the restraints of real priorities.

Figure 1:
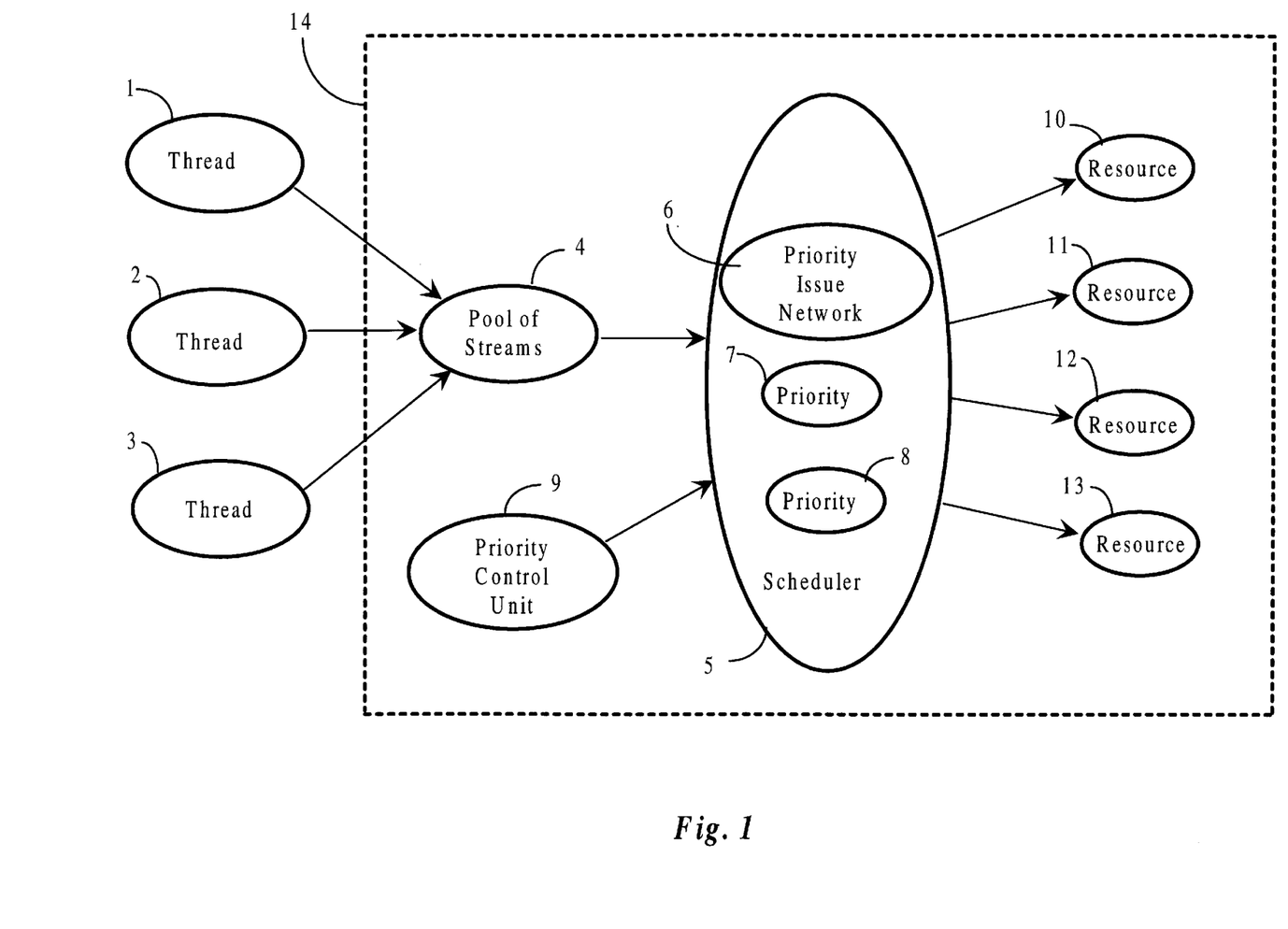
FIG. 1 is a diagram illustrating a prioritized instruction scheduler's role in allocating threads to processor resources according to an embodiment of the present invention.

FIG. 1 is a diagram illustrating flow of instructions and exemplary operation of a multi-streaming processor 14 in an embodiment of the invention, including a prioritizing instruction scheduler 5 allocating streams to available processor functional resources 10–13 Thread 1, thread 2 and thread 3 represent in this example programs stored in memory that are to be executed as concurrent processor streams. Threads may come from a variety of sources, such as, but not limited to separate application programs, portions of a single multi-threaded program, or instruction threads fetched as a result of interrupt service routines. The processor in this example fetches and decodes instructions from active threads 1 and 2, gathering a pool of streams 4 containing instructions ready to execute. Thread 3 in this example is treated as inactive. Scheduler 5 allocates streams to resources 10 through 13.

Each of the active streams has an associated instant priority, shown as priority 7, associated with the stream running thread 1, and priority 8, associated with the stream running thread 2. The priority of each stream determines its instant access to resources 10–13, and, in an additional feature of the invention, also determines relative claim to resources 10–13. Priority issue network 6 uses priorities 7 and 8 to assign instructions from each prioritized stream to resources 10–13 according to one or more mechanisms.

A priority control unit 9 monitors priority status for streams, and in some cases determines or amends priority according to accessible criteria, including for example, a history of processing activity, such as cache and memory requests and utilization of resources, varying priorities dynamically, as frequently in some embodiments as each processor cycle, as necessary to meet the timing requirements of threads and optimize the utilization of processing resources. In sophisticated embodiments, logic in priority control unit 9 may switch among scheduling mechanisms dynamically, depending on the requirements of threads 1–3.

Figure 2:
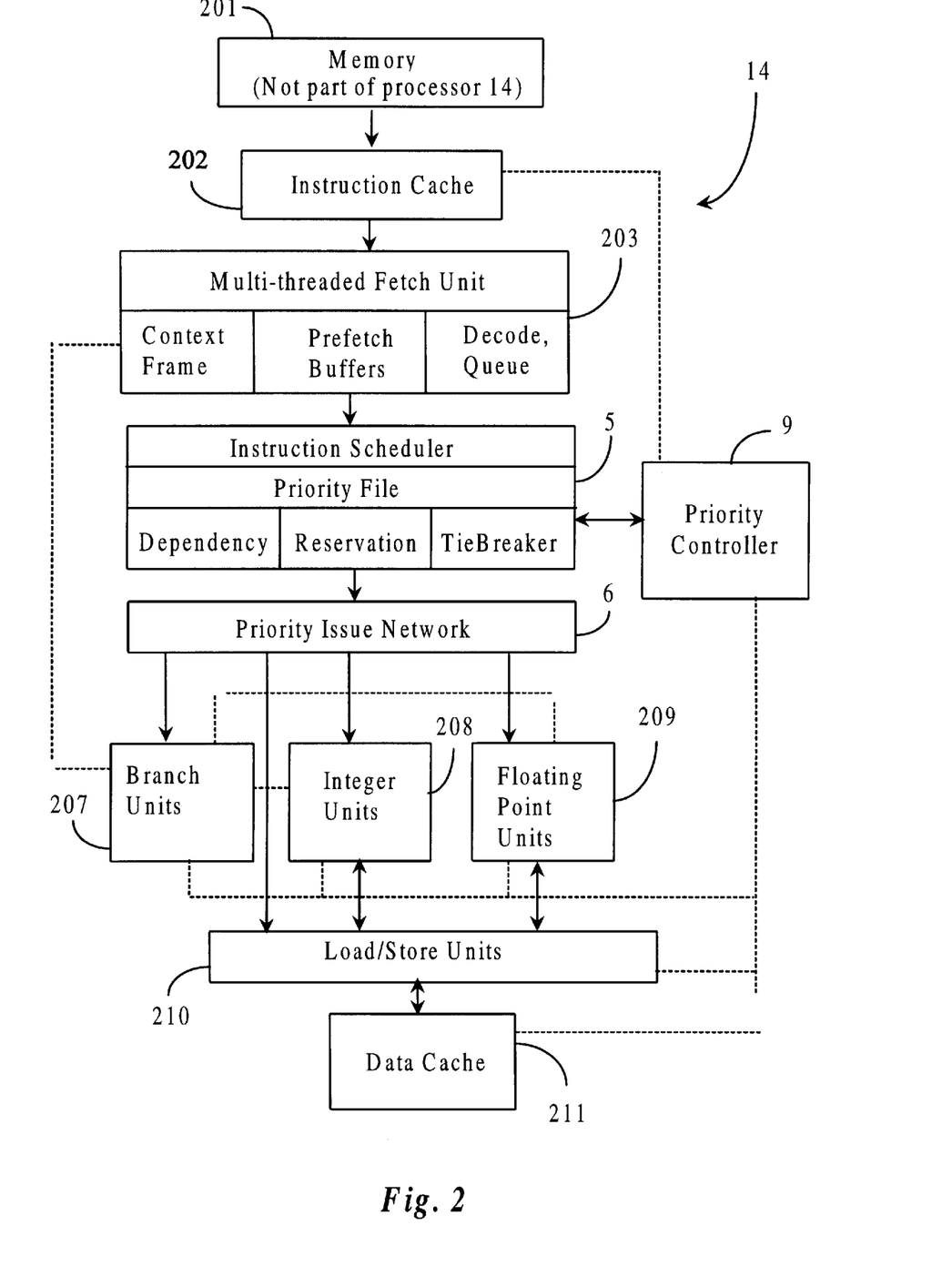
FIG. 2 is a block diagram illustrating a system architecture for a multi-streaming processor, including a prioritized instruction scheduler according to an embodiment of the present invention.

FIG. 2 is a block diagram illustrating architecture in a preferred embodiment of multi-streaming processor 14 of FIG. 1. Solid lines represent paths of instructions and data; dotted lines represent control paths.

Memory 201 in this example contains instructions for one or more threads, which may be programs or portions of programs to be executed concurrently in the processor. The processor reads instructions from multiple threads into instruction cache 202 and data associated with the instructions into data cache 211. Typically, under the control of multi-threaded fetch unit 203, instructions from instruction cache 202 are transferred into multi-threaded fetch unit 203, where they are stored in prefetch buffers, decoded and placed in one or more queues. A single queue may be shared among streams or partitioned into units for each stream in various embodiments. In some cases a queue may be dedicated to one or a set of resources, or any combination of streams and resources.

The net effect of the queues is that there are concurrent streams of instructions from which eligible instructions may be issued to functional resources. Each stream that the processor is equipped to execute has a context frame containing the program counter and register file for that stream. A thread is made active by loading an available context frame with the thread's program counter address and register values and by assigning it an active priority. There may be only a single thread to be executed, in which case there is a single stream of instructions to execute. When there are more active threads than streams available to execute threads, a number of threads up to the available number of context frames are made active and the remaining threads remain temporarily inactive. It is typically a function of an operating system to assign threads to streams of a multi-streaming processor.

Instructions from multiple streams may be interleaved for execution on a cycle-by-cycle basis, or less frequently, for example, during long latency memory operations. Instruction scheduler 5 determines the order in which instructions from multiple streams are executed and dispatches selected instructions to priority issue network 6. Instructions that load and store from memory may be monitored by instruction scheduler 5 so that operation of memory 201, data cache 211, instruction cache 202, and other resources may be regulated as well as functional units 207 through 210.

Within instruction scheduler 5, instructions are temporarily stored in reservation stations and evaluated for dependencies, so that instructions that depend on the prior execution of other instructions are delayed appropriately. Priority issue network 6 assigns each instruction to appropriate functional units 207–210 for execution. Functional units may comprise one or more integer units 208 and may include branch units 207, floating point units 209 and load/store units 210. When multiple functional units of any type are available, instruction scheduler 204 and priority issue network 206 manage the allocation of instructions to any available functional unit. Instruction scheduler 5 contains a priority record, which may be a file or a set of registers, with priorities recorded for one or more of the streams. There may therefore be fewer priorities than streams, with streams that lack active priority being handled at a default level, or every stream may have a specific priority.

Whenever there are multiple streams there must be a mechanism for selecting which stream is allowed access to resources. Any means of managing access among streams may be considered broadly a priority scheme. It is common in the art, for example, to assign static priority in descending order to streams. In this scheme one stream always has the highest priority, and the other streams lesser priority in descending order. In the static case for four streams labeled A, B, C, and D, Table 1 below is the priority table, with 0 indicating highest priority, 1 next lower, 2 next lower, and 3 indicating the lowest priority.

TABLE I

|  | Stream A | Stream B | Stream C | Stream D |
| --- | --- | --- | --- | --- |
| Priority | 0 | 1 | 2 | 3 |

In a static priority scheme as indicated in Table I, stream A always has the highest priority, and waiting instructions will be issued from stream A to functional units until there are no waiting instructions in stream A. At that point in time stream B, having next lower priority to stream A, is granted access to functional units and, and instructions are issued from stream B until there are no instructions waiting for stream B. It may be, of course, that there are no instructions in stream B when access shifts to stream B, in which case access goes to stream C, and so on. The constraint is that the priority for each stream remains constant, that is, static.

It has been found in the art that in many cases, especially as stream plurality increases, the static scheme causes problems, such as starvation of threads assigned to streams of lower priority. In reaction, to promote fairness in access to functional resources, a round robin scheme has been proposed and implemented in the art wherein priority is shifted regularly among streams. Such a round robin scheme is represented in Table II below:

TABLE II

|  | Stream A | Stream B | Stream C | Stream D |
| --- | --- | --- | --- | --- |
| T1 | 0 | 1 | 2 | 3 |
| T2 | 1 | 2 | 3 | 0 |
| T3 | 2 | 3 | 0 | 1 |
| T4 | 3 | 0 | 1 | 2 |

The rows in Table II represent time slices. At time TI the priorities in that row apply until time T2. At time T2 the priorities in that row apply, and so on. In the round robin scheme, priority rotates at specific time intervals as shown, and at least theoretically, each stream is granted equal access to the functional resources.

The inventors have discovered in their work that there are many and significant drawbacks to the static and round robin schemes with unlimited resource access, as described immediately above for prior art devices. These techniques simply do not address changing conditions, real-time demands, and the structural nature of different threads in their need for predominantly one class or another of resources. More needs to be done. The inventors have accordingly provided apparatus and methods for significantly improving priority scheduling and issue of instructions.

A closer examination of the matter of priority, broadly addressed, reveals that there are more issues than simple priority. These issues may, in one view, be stated as follows:
1. Which stream is to be granted access to functional resources?
2. How much access is to be granted?
3. Which stream is to have access next ?
4. What happens in case of a tie?

In present and conventional systems these questions are at best only very poorly addressed, if at all. In various embodiments of the present invention all of these questions (issues) are addressed, and in a variety of ways for a variety of purposes.

In some embodiments of the present invention a single number is used, as to represent a stream's priority and that number is used by the scheduler to allocate access to resources such as, but not limited to, functional units, memory and caches. In other embodiments, a list of numbers stores multiple priorities for a stream, each number representing the associated stream's priority claim to a class of resources, a class being a set of integer units, floating point units, or the like. In still other embodiments a stream is granted access as the instant highest priority stream, but limited in that access to a single functional unit.

In another embodiment a list of numbers for each stream stores a stream's claim to individual resources. For example, in a processor with multiple integer and floating point units, a priority number can be used in connection with each integer unit and each floating point unit. More complex representations of priority are used when a finer-grained control over resources is needed to satisfy more demanding timing requirements or assure more complete utilization of resources.

Specifically, in embodiments of the present invention, perturbations of round robin and static schemes are still used for moving a pointer among streams. Much more sophisticated mechanisms for priority are implemented however than in the prior art. For example, in an embodiment of the present invention a static priority may be assigned among four streams, as in Table 1 above. The mechanism for issuing instructions, however, may limit access for instructions from the streams to one or a specific combination of classes of resources. This selectivity of classes of resources may be a property of the priority for just one stream, the highest priority stream for example, or for more than one, or for all of the streams, with access to resources outside the limited class allowed under special conditions.

In other embodiments of the invention two or more streams may have the same priority, but different access rights to functional resources, including exclusivity or some amount of overlap in access. In this unique scheme there may be conflict requiring a tie-breaker, and a tie-breaker unit is provided for the purpose of determining access in case of a tie, which may be according to recent processing history on the chip (who had last access?), or by other criteria as conditions may dictate. For example, in case of a tie, access may be partitioned equally among tied streams.

In conventional processors interrupts (for those processors and applications where interrupts are used) are prioritized. That is, the nature of an interrupt is to stop the processor from what it is currently doing and to vector its activity to an interrupt service routine. In embodiments of the present invention, in cases where an interrupt service routine must be serviced within a small number of cycles, it may be given a high priority assuring that all necessary resources are available to it. However, normal threads may have, in some cases, more stringent timing requirements than that of certain interrupts, in which case they may be assigned higher priorities than interrupts.

Beyond the new and novel features of access rights as a part of priority and tie-breaking logic, in specific embodiments of the present invention a powerful new concept is brought to the art: Dynamic determination and management of priority in multi-streaming processors.

In embodiments of the invention priority control unit 9 determines the context wherein priorities are interpreted by instruction scheduler 5 to allocate instructions. For example, the stream with the highest priority may always take precedence over a stream with a lower priority. Alternatively, the scheduler may guarantee minimal access to all streams, but increase access in proportion to a stream's priority. Round robin or random scheduling may be used, as described above, with a number of processor cycles allocated in turn to each stream varied according to the stream's priority. That is, in a conventional limited round robin scheme, streams are selected in order, and each stream selected is allocated the same attention or resources. In embodiments of the present invention, however, streams are serviced in a round robin order, but each stream is allocated resources according to instant priority.

As an example of priority management, as described above, each stream accessed may be allocated access to all resources for a number of cycles determined by that stream's instant priority. In another embodiment, each stream accessed may be allocated access to functional units according to instant priority. For example, a stream may, in a static scheme, be allowed to use certain functional units, but as its priority changes, it will be allowed access to more or fewer of available functional units. Importantly, the issue order and access rights may be dynamically varied by priority controller 9.

Priorities in some embodiments may be interpreted as fractions representing a stream's desired average utilization rate of one or more resources. In particularly sophisticated embodiments, processors may be provided with more than one of the aforementioned scheduling methods in combination, wherein priority control unit 9 may dynamically choose among methods or use multiple methods in various combinations. In other embodiments, scheduling methods and individual priorities may also be chosen under software control. When software does not specify a method, priority control unit 9 may default to a conventional method, such as round robin or static scheduling.

When a list of numbers is used for each priority, priority controller 9 manages each class of resources or each resource individually. Conflicting demands on a resource or class of resources are resolved by comparing like entries in each stream's priority list, according to any of the scheduling methods described above, alone or in combination.

In some cases, priorities of two or more streams may be identical. In this case instruction scheduler 5 has a tiebreaker mechanism, as introduced above. The tiebreaker can resolve conflicts using dynamic or static methods. For example, if round robin scheduling is used, each stream with identical priority would receive an equal share of resources. Alternatively, conflicts could be resolved on the basis of which resources the stream's current instruction requires or the utilization rate of various resources, or by random scheduling.

Priority control unit 9 also can change any stream's priority. Such changes may take place as frequently as in a fraction of a processor cycle, or less frequently, for example each memory cycle, or when long latency memory instructions are issued. Changes in priorities may be made under software control or in response to conditions within the processor or other system components. In one embodiment, priority control unit 9 monitors utilization of one or more processing resources such as frequency of access to functional units, memory and caches. Priorities are then varied to optimize throughput of streams or maximal utilization of one or more resources, or to strike a balance between throughput and utilization. When memory is monitored, priority may be changed based upon the range of addresses or memory segment being accessed. In embodiments wherein memory 201 is segmented, memory cycles are slower than processor cycles and multiple segments may be accessed concurrently, instruction scheduler 5 may then interleave access to multiple segments to optimize memory utilization. In an embodiment that monitors two or more resources, priorities may be set to optimize utilization of one resource or to balance utilization of multiple resources, and such a balance may be varied dynamically.

In some embodiments, resources such as integer units 208 or floating point units 209 may be dynamically reconfigured, changing the data path to be more efficient for certain instructions. For example, an integer unit could be reconfigured between instructions to either multiply two numbers together or add them. In one such embodiment, instruction scheduler 5 examines instructions in its reservation stations and/or in the instruction queue of multi-threaded fetch unit 203 to determine optimal functional unit configurations and priority issue network 206 performs reconfigurations as necessary.

In the prior art, processors have used fixed scheduling mechanisms that do not allow flexible assignment of resources to multiple program threads. Dynamic prioritization of streams permits a dynamic configuration of processing resources to meet the needs of the combination of concurrent streams at any and every point in time. For example, real-time threads with stringent timing requirements may be given a higher priority to assure that their requirements are met, while less demanding streams may be serviced in the background. Moreover, because a priority control unit can monitor various aspects of processing, such as the content of an instruction cache, priorities can be varied during execution to achieve processing goals, such as servicing a stream of incoming data that arrives at a variable rate. Alternatively, at times when no threads have stringent requirements, scheduling may be reconfigured to keep all available resources busy, thereby maximizing total processor throughput. By permitting more efficient uses of resources, a smaller, less expensive processor may be designed using the present prioritized scheduler than using conventional technology.

In one preferred embodiment of the present invention a unique priority number is assigned to a stream to disable that stream in the issuing order, until a predetermined event or set of conditions signals to re-enable the stream. For example, in such an embodiment a multi-streaming processor having four streams may have five priority numbers 0–4, wherein priority of zero may be set for a stream, and zero is interpreted by the system to disable the stream. Priority 1 is then the lowest priority, 2 the next higher, and 4 the highest.

There exist many reasons in the art for which it may be desired to disable a stream, and assignment of the disable priority may be based on any of a variety of criteria, including availability of data or instructions, input from off-chip, a particular combination of threads, and so on. In one embodiment a processor interrupt may be used to enable and disable a stream. In this embodiment a disabled stream may be signaled to wake up by an interrupt. The priority controller in this embodiment would modify the priority file to assign a non-zero priority to the disabled (sleeping) stream.

In another embodiment priority may be managed according to stream loading. In this scheme, thresholds may be set, and as streams fetch available instructions that are able to be issued, priority is assigned according to the thresholds. The granularity in such a scheme may be course or fine, as needed.

In the embodiments described priority controller 9 has been described as managing priority, including access rights and so on, and placing the necessary criteria in a priority file in instruction scheduler 5. It will be apparent to the skilled artisan that the table of criteria for priority and access could reside elsewhere, and the priority control could also be implemented in a number of ways, all within the skill of a competent engineer having knowledge of the teachings herein. The specific architecture shown is therefore not limiting.

Further to the above, several mechanisms and criteria for dynamically managing priority and access have been disclosed as functions of Priority Controller 9. Priority Controller 9 may be implemented in a variety of ways, and may perform its functions by a mix of hardware and software techniques. In some embodiments controller 9 may, for example, access registers indexed by counters to ascertain statistics pertaining to recent processing history, such as use of FP units as opposed to Integer units, and manage priority rights as a result. In some embodiments the priority controller may execute one or more code routines (algorithms) for determining priority and access rights. In still other embodiments the priority controller may be programmable to some extent, and accept input from off-chip to determine and set priority and access rights.

The features of the present invention permit improvement in many types of devices that use multiple streams. For example, modern network routers and switches are called upon to handle multiple streams or flows of packets of incoming data and dispatch them to various destinations on the network. Certain network protocols, such as Asynchronous Transfer Mode, can provide guarantees of services to data flows, assuring timely forwarding of data through a network device. The present invention can be used to optimize processing within such a device by, for example, giving higher priority to threads handling network data than to threads that negotiate quality of service or reconfigure the paths that data takes through the device. When the quality of service of each of several data flows may be different, streams with differing priorities may be used to meet the service guarantees.

In another aspect of the invention processors according to embodiments of the invention may enhance workstations. Workstations are typically general-purpose computers that are called upon to handle a wide variety of mixes of concurrent programs. For example, a workstation may be concurrently playing an MPEG video, sending data to a printer, responding to typing and other inputs from a user and running application programs such as a Web browser and a word processing program. Using the teachings of the present invention in processors for workstations permits improvements in responding to the varied demands of each stream. For example, the MPEG video stream can be given high priority access to resources needed for decoding frames and to video memory, while an interrupt service routine for the printer is given a priority sufficient to drive the current printer at its maximum printing rate. Application programs may be given second-level priority to video memory.

In another aspect, robotic devices are known that must respond in real time to sensors, actuators and control inputs. By partitioning the operating software for such devices into threads and assigning priorities appropriately, several sets of timing requirements may be met simultaneously, and robotic devices may be operated more efficiently with less powerful, and therefore less expensive processors than has been the case in the current art.

In yet another embodiment of the invention features of the present invention are implemented in special processors known in the art as Digital Signal Processors (DSPs), which are special processors for processing what may be termed "natural data", typically streamed in an analog fashion, by representing the data in a digital protocol, then processing the data in pre-determined ways. Many such processors are used for audio processing in telephony systems and other systems utilizing audio streams. This technology is extended as well into the video realm. In many cases there exist opportunities in such systems for multi-threading, hence for multi-streaming, and thence for priority control according to the teachings of the present invention.

It is emphasized that there are few, if any, limitations in the types and sizes of processors that may be improved in functionality by application of the teachings of the present invention. Small processors with single functional units, such as embedded controllers for hard-to-reach equipment, can be thus enhanced, if there are multiple threads that may be processed. Applications extend to special microcontrollers implemented as ASICs, and to essentially all other sorts of digital processors. Only a few examples of the many are mentioned here.

It will be apparent to the skilled artisan that many alterations may be made in embodiments of the invention described within the spirit and scope of the invention. There are, for example, many ways that hardware functionality may be provided in a processor, while accomplishing essentially the same purpose or function. Similarly, there are many ways that software and firmware may be structured by different programmers, or the same programmer, while still accomplishing essentially the same purpose or function. Additionally processors according to embodiments of the present invention may have widely varying architecture regarding such things as number of stream resources, number of functional units, and the like. Such variations should be considered within the scope of the invention, and the invention is limited only by the claims below:

What is claimed is:

1. A multi-streaming processor comprising:
    a plurality of streams for streaming one or more instruction threads;
    a set of functional resources for processing instructions from streams;
    an instruction scheduler for managing access for the streams to the functional resources;
    a priority record of priority codes associated with streams, with one or more priority codes associated with one or more of the streams; and
    a priority controller coupled to the priority record;
    wherein at any point in time the instruction scheduler manages access for a stream to the functional resources according to the priority record for streams, regardless of any priority associated with threads, and the priority controller alters the one or more priority codes for streams in the priority record dynamically during processing.

2. The processor of claim 1 wherein the alteration of priority codes is accomplished at least in part in a manner determined by changes in on-chip processing statistics.

3. The processor of claim 1 wherein determination of priority codes is accomplished at least in part off-chip, and communicated to the priority controller.

4. The processor of claim 1 wherein a particular priority code effectively disables a stream, preventing access for that stream to functional resources.

5. The processor of claim 4 wherein the priority controller alters the priority record to enable and disable a stream in response to on-chip events, processing statistics, or external input.

6. The processor of claim 4 wherein the priority controller alters the priority record to enable and disable a stream in response to a processor interrupt.

7. The processor of claim 2 wherein the priority controller alters priority codes according to instant states of stream instruction loading.

8. The processor of claim 1 further comprising a tie-breaker function, the tie-breaker resolving access to functional resources for two or more streams having equal priority in the priority record.

9. A multi-streaming processor comprising:
    a plurality of streams for streaming a plurality of instruction threads;
    a set of functional resources for processing instructions from stream resources;
    an instruction scheduler for managing access for streams to the functional resources;
    a priority record of priority codes associated with streams; and
    a priority controller dynamically determining priorities for streams regardless of any priority for threads, and altering the priority record for streams during processing.

10. The processor of claim 9 wherein the alteration of the priority record is accomplished at least in part in a manner determined by on-chip processing statistics.

11. The processor of claim 9 wherein alteration of the priority record is accomplished at least in part off-chip, and communicated to the priority controller.

12. The processor of claim 9 wherein a particular priority code effectively disables a stream, preventing access for that stream to functional resources.

13. The processor of claim 12 wherein the priority controller alters the priority record to enable and disable a stream in response to on-chip events, processing statistics, or external input.

14. The processor of claim 12 wherein the priority controller alters the priority record to enable and disable a stream according to a processor interrupt.

15. The processor of claim 10 wherein the priority controller alters priority codes according to instant states of stream instruction loading.

16. The processor of claim 9 further comprising a tie-breaker function, the tie-breaker resolving access to functional resources for two or more streams having equal priority in the priority record.

17. A method for processing instructions from streams by priority in a multi-streaming processor, comprising steps of:
    (a) associating priority codes with one or more of the streams and storing the codes in a priority record;
    (b) checking priority codes in the priority record by an instruction scheduler during processing;
    (c) managing access for streams to functional resources preferentially based on the priority codes for the streams, regardless of any priority associated with threads; and
    (d) altering the priority codes in the priority record dynamically during processing by a priority controller coupled to the priority record.

18. The method of claim 17 wherein the alteration of priority codes is accomplished at least in part in a manner determined by changes in on-chip processing statistics.

19. The method of claim 17 wherein determination of priority codes is accomplished at least in part off-chip, and communicated to the priority controller.

20. The method of claim 17 wherein a particular priority code effectively disables a stream, preventing access for that stream to functional resources.

21. The method of claim 20 wherein the priority controller alters the priority record to enable and disable a stream in response to on-chip events, processing statistics, or external input.

22. The method of claim 20 wherein the priority controller alters the priority record to enable and disable a stream in response to a processor interrupt.

23. The method of claim 17 wherein the priority controller alters priority codes according to instant states of stream instruction loading.

24. The method of claim 17 further comprising a tie-breaker function, the tie-breaker resolving access to functional resources for two or more streams having equal priority in the priority record.

25. A method for processing instructions from streams by priority in a multi-streaming processor, comprising steps of:
（a) associating priority codes with one or more of the streams and storing the codes in a priority record;
(b) checking priority codes in the priority record by an instruction scheduler during processing;
(c) ) managing access for streams to functional resources preferentially based on the priority codes, regardless of any priority associated with threads; and
(d) dynamically altering priority codes in the priority record by a priority controller during processing.

26. The method of claim 25 wherein, in step (d), the alteration of priority codes is accomplished at least in part in a manner determined by changes in on-chip processing statistics.

27. The method of claim 25 wherein, in step (d), determination of priority codes is accomplished at least in part off-chip, and communicated to the priority controller.

28. The method of claim 25 wherein a particular priority code effectively disables a stream, preventing access for that stream to functional resources.

29. The method of claim 28 wherein the priority controller alters the priority record to enable and disable a stream in response to on-chip events, processing statistics, or external input.

30. The method of claim 28 wherein the priority controller alters the priority record to enable and disable a stream in response to a processor interrupt.

31. The method of claim 25 wherein the priority controller alters priority codes according to instant states of stream instruction loading.

32. The method of claim 25 further comprising a tie-breaker function, the tie-breaker resolving access to functional resources for two or more streams having equal priority in the priority record.

33. A computer comprising:
a memory for storing application programs and data; and
a multi-streaming processor coupled to the memory and having a plurality of streams for processing a plurality of instruction threads, a set of functional resources for processing instructions from the streams, an instruction scheduler for managing access for the streams to the functional resources, a priority record including one or more priority codes associated with one or more of the streams, and a priority controller coupled to the priority record;
wherein at any point in time the instruction scheduler manages access for a stream to the functional resources according to the priority record for the streams, regardless of any priority associated with threads, and the priority controller alters the one or more priority codes dynamically during processing.

34. The computer of claim 33 wherein the alteration of priority codes is accomplished at least in part in a manner determined by changes in on-chip processing statistics.

35. The computer of claim 33 wherein determination of priority codes is accomplished at least in part off-chip, and communicated to the priority controller.

36. The computer of claim 33 wherein a particular priority code effectively disables a stream, preventing access for that stream to functional resources.

37. The method of claim 36 wherein the priority controller alters the priority record to enable and disable a stream in response to on-chip events, processing statistics, or external input.

38. The computer of claim 36 wherein the priority controller alters the priority record to enable and disable a stream in response to a processor interrupt.

39. The computer of claim 33 wherein the priority controller alters priority codes according to instant states of stream instruction loading.

40. The computer of claim 32 further comprising a tie-breaker function, the tie-breaker resolving access to functional resources for two or more streams having equal priority in the priority record.

41. A computer comprising:
a memory for storing application programs and data; and
a multi-streaming processor coupled to the memory and having a plurality of streams for streaming a plurality of instruction threads, a set of functional resources for processing instructions from stream resources, an instruction scheduler for managing access for the streams to the functional resources, and a priority record of priority codes associated with the streams;
wherein a priority controller dynamically determines priority codes for streams during processing, regardless of any priority associated with threads, and alters the priority record accordingly.

42. The computer of claim 41 wherein the alteration of the priority record is accomplished at least in part in a manner determined by on-chip processing statistics.

43. The computer of claim 41 wherein alteration of the priority record is accomplished at least in part off-chip, and communicated to the priority controller.

44. The computer of claim 41 wherein a particular priority code effectively disables a stream, preventing access for that stream to functional resources.

45. The computer of claim 44 wherein the priority controller alters the priority record to enable and disable a stream in response to on-chip events, processing statistics, or external input.

46. The computer of claim 44 wherein the priority controller alters the priority record to enable and disable a stream in response to a processor interrupt.

47. The computer of claim 41 wherein the priority controller alters priority codes according to instant states of stream instruction loading.

48. The computer of claim 41 further comprising a tie-breaker function, the tie-breaker resolving access to functional resources for two or more streams having equal priority in the priority record.

49. A packet-data router for a packet data network, comprising:
at least one port for connecting to the packet-data network;
a memory for storing application code; and
a multi-streaming processor coupled to the memory and having a plurality of streams for streaming a plurality of instruction threads, a set of functional resources for processing instructions from stream resources, an instruction scheduler for managing access for the streams to the functional resources, and a priority record of priority codes associated with the streams;
wherein a priority controller dynamically determines priority codes for streams during processing regardless of any priority associated with threads, and alters the priority record accordingly.

50. A digital signal processor, comprising:

a plurality of streams for streaming a plurality of signals as separate threads;

a set of functional resources for processing signals;

a scheduler for managing access for the signals to the functional resources; and a priority record of priority codes associated with the streams;

wherein a priority controller dynamically determines priority codes for the streams during processing regardless of any priority associated with threads, and alters the priority record accordingly.

* * * * *